(12) United States Patent
Schmalz et al.

(10) Patent No.: US 6,652,014 B2
(45) Date of Patent: Nov. 25, 2003

(54) VACUUM GRIP SYSTEM FOR GRIPPING AN OBJECT, AND HANDLING APPARATUS FOR HANDLING AN OBJECT USING A VACUUM GRIP SYSTEM

(75) Inventors: Kurt Schmalz, Glatten (DE); Thomas Eisele, Fluorn-Winzeln (DE); Thomas Graf, Glatten (DE); Charalambos Tassakos, Wuerselen (DE); Jens Schick, Herrenberg (DE)

(73) Assignees: J. Schmalz GmbH, Glatten (DE); Inos Automationssoftware GmbH, Herrenberg (DE)

( * ) Notice: Subject to any disclaimer, the term of this patent is extended or adjusted under 35 U.S.C. 154(b) by 49 days.

(21) Appl. No.: 09/732,365

(22) Filed: Dec. 8, 2000

(65) Prior Publication Data

US 2001/0052708 A1 Dec. 20, 2001

(30) Foreign Application Priority Data

Dec. 9, 1999 (DE) .......................................... 199 59 285

(51) Int. Cl.[7] .......................... B25J 15/06; B65G 47/91; B65G 59/02; B66C 1/02
(52) U.S. Cl. .................. 294/65; 294/87.1; 294/907; 414/737; 414/797; 901/40
(58) Field of Search .................. 294/64.1, 65, 86.4, 294/87.1, 907; 414/737, 752.1, 607, 796.9, 797; 901/40, 46

(56) References Cited

U.S. PATENT DOCUMENTS

| | | | | |
|---|---|---|---|---|
| 3,115,262 A | * | 12/1963 | Avery | 414/627 |
| 3,561,620 A | * | 2/1971 | Willis | 414/607 |
| 4,073,532 A | * | 2/1978 | Blair | 294/107 |
| 4,139,107 A | * | 2/1979 | Ninomiya et al. | 294/907 |
| 4,383,788 A | * | 5/1983 | Sylvander | 294/86.4 |
| 4,439,093 A | * | 3/1984 | Victorino | 414/797 |

(List continued on next page.)

FOREIGN PATENT DOCUMENTS

| | | | | |
|---|---|---|---|---|
| DE | 3234216 | | 3/1984 | |
| DE | 4213301 | * | 10/1993 | 414/796.9 |
| DE | 4328155 | | 2/1995 | |
| DE | 19618344 | | 11/1997 | |
| DE | 19626826 | | 1/1998 | |
| DE | 19943356 | * | 5/2000 | |
| FR | 2617078 | * | 12/1988 | 901/40 |
| FR | 2639335 | * | 5/1990 | 901/40 |
| JP | 0004964 | * | 1/1978 | 294/86.4 |
| JP | 0301037 | * | 12/1989 | 901/40 |
| JP | 0009594 | * | 1/1990 | 901/46 |
| JP | 0152091 | * | 6/1991 | 294/64.1 |
| JP | 404041188 | * | 2/1992 | 901/46 |
| NL | 284607 | * | 3/1964 | 414/627 |

Primary Examiner—Dean J. Kramer
Assistant Examiner—Paul T. Chin
(74) Attorney, Agent, or Firm—Birch, Stewart, Kolasch & Birch, LLP

(57) ABSTRACT

The invention relates to a vacuum grip system (10) for gripping at least one object (11a). The vacuum grip system (10) has a base unit (18) and at least two suction units (19, 20) affixed thereto, disposed at right angles to one another, and each having at least one suction gripper (21, 22). At least one of the suction units (19, 20) grasps the object or objects (11a) to be gripped from above, and at least one of the suction units (19,20) grasps the object or objects (11a) from one side. In order to provide The vacuum grip system (10) having maximum flexibility, it is proposed to affix the suction units (19, 20) to the base unit (18) such that, in order to grip the object (11a), the distance between the upper suction unit (19) and the lateral suction unit (20) may be varied. It is further proposed that the vacuum grip system (10) have a mechanical undergripper (25) upon which the gripped object (11a) may be laid.

37 Claims, 10 Drawing Sheets

U.S. PATENT DOCUMENTS

| | | | |
|---|---|---|---|
| 4,696,613 A | * | 9/1987 | Hahn .......................... 294/65 |
| 4,746,255 A | * | 5/1988 | Roccabianca et al. ...... 414/902 |
| 4,772,170 A | * | 9/1988 | Oldfield ...................... 294/907 |
| 4,789,295 A | * | 12/1988 | Boucher. et al. ........... 294/86.4 |
| 4,863,340 A | * | 9/1989 | Masunaga et al. .......... 294/907 |
| 4,884,938 A | * | 12/1989 | Fujita et al. .................. 901/40 |
| 4,911,608 A | * | 3/1990 | Krappitz et al. ............ 294/907 |
| 5,074,745 A | * | 12/1991 | Neri .......................... 294/907 |
| 5,088,878 A | * | 2/1992 | Focke et al. ............... 294/64.1 |
| 5,102,114 A | * | 4/1992 | Suda .......................... 901/40 |
| 5,102,292 A | * | 4/1992 | Brinker et al. ............. 414/796 |
| 5,125,706 A | * | 6/1992 | Kuwaki et al. ................ 294/65 |
| 5,190,430 A | * | 3/1993 | Neri et al. ................... 414/797 |
| 5,232,332 A | * | 8/1993 | Focke ........................ 414/797 |
| 5,238,355 A | * | 8/1993 | Boldrini et al. .............. 414/797 |
| 5,411,362 A | * | 5/1995 | Neri et al. ................... 294/907 |
| 5,542,729 A | * | 8/1996 | Ohtonen ...................... 294/65 |
| 5,564,893 A | * | 10/1996 | Tacchi et al. ................ 414/797 |
| 5,632,590 A | * | 5/1997 | Pearson et al. ............. 294/907 |
| 5,984,623 A | * | 11/1999 | Smith et al. ................... 294/65 |
| 6,022,187 A | * | 2/2000 | Focke et al. ................ 294/64.1 |
| 6,332,750 B1 | * | 12/2001 | Donner et al. ........... 414/796.9 |

* cited by examiner

VACUUM GRIP SYSTEM FOR GRIPPING AN OBJECT, AND HANDLING APPARATUS FOR HANDLING AN OBJECT USING A VACUUM GRIP SYSTEM

BACKGROUND OF THE INVENTION

Field of the Invention

The present invention relates to a vacuum grip system for gripping at least one object. The vacuum grip system has a base unit to which are affixed at least two suction units, each having at least one suction gripper. The suction units are disposed at right angles to one another, whereby at least one of the suction units grasps the object or objects to be gripped from above, and at least one of the suction units grasps the object or objects to be gripped from a lateral side.

The invention further relates to a handling apparatus for handling at least one object using a vacuum grip system, whereby the vacuum grip system is affixed to one arm of a handling robot or an overhead robot. Such handling apparatuses are used in various applications. "Handling" is primarily understood to mean picking up or suctioning, lifting or turning, moving or fixing, or palletizing or depalletizing.

For the vacuum grip system of the aforementioned type, the suction grippers or suction units are, for example, constructed as flat suction grippers, accordion-pleated suction grippers, or specialized suction grippers. Flat suction grippers are particularly suited for accepting horizontal forces. The seal between the flat suction gripper and the object to be gripped can be constructed as a single sealing lip (for objects with a smooth surface such as sheet metal, cardboard boxes, glass sheets, or lumber), as a sealing edge (for objects with a rough, textured surface such as wood, stone, textured glass, or corrugated sheet metal), or as a double sealing lip (for flexible objects such as oxidized sheet metal). Accordion-pleated suction grippers are particularly adaptable to objects having uneven surfaces. Applying suction to the object to be gripped also produces a lifting effect. Accordion-pleated suction grippers are especially suited for gripping large-surface, flexible objects. Specialized suction grippers are adaptable in material, shape, and support surface for special applications such as high temperatures, chemical applications, and handling of CDs, film, or paper.

The suction units of the vacuum grip system of the aforementioned type are disposed at right angles to one another, whereby at least one of the suction units grasps the object or objects to be gripped from above, and at least one of the suction units grasps the held object or objects from a lateral side. Such grippers are also known as angled grippers. Angled grippers having two suction units are advantageous in that they securely grip the object to be gripped from the top and from the side, as well as grip the object from only one side, thus allowing flexible palletizing of the object to be gripped (so-called "pick to pallets") to be easily performed. In order to enable flexible palletizing of the object, the object to be gripped must be capable of contacting other objects already laid on a pallet on either the left or right side of the object. This is not possible if the gripped object is grasped not only by the suction unit on the front sides, but also by additional suction units on the left and/or right side, or gripped on the top side and on at least two lateral sides. In known angled grippers of current art, the suction grippers are disposed at a fixed distance from one another.

SUMMARY OF THE INVENTION

The object of the present invention is to develop and further elaborate upon a vacuum grip system of the aforementioned type, such that objects of differing dimensions can be easily gripped using the vacuum grip system, and that the vacuum grip system can at the same time hold a gripped object securely and reliably.

This object is achieved by the present invention, proceeding from the vacuum grip system of the aforementioned type, by affixing suction units to a base unit such that, in order to grip at least one object, the distance between the suction unit or units on the top side of the object or objects, and the suction unit or units on the lateral side of the object or objects, may be varied.

For the vacuum grip system according to the present invention, the distance between the suction units may be adjusted in such a manner, for example, that the suction unit or units on the top side of the object is displaceably constructed parallel to the top side, and/or the suction unit or units on the lateral side of the object is displaceably constructed parallel to the lateral side. Moving the suction units away from one another increases the distance, and moving the suction units toward one another decreases the distance.

For the vacuum grip system, one or several suction units may be affixed on the top side as well as on one lateral side. Each of the suction units has at least one suction gripper, generally known from the current art. The vacuum grip system can grip one or several objects. Such an object may be a single rectangular carton or an essentially rectangular carton pallet, for example, upon which goods are arranged and bonded to the carton pallet by means of a plastic film. However, such an object may also be an essentially rectangular sack or an essentially rectangular bag.

The vacuum grip system according to the present invention has the advantage that the distance between the suction unit or units on the top side of the object or objects, and the suction unit or units on the lateral side of the object or objects can be increased, provided that the dimensions of the object or objects to be gripped permit this. The object is thereby gripped with a large lifting arm between the suction units on the top side of the object and the suction units on the lateral side of the object, thus enabling significantly more secure lifting and holding. Depending on the height of an object to be gripped, an optimal distance between the suction units on the top side of the object and the suction units on the lateral side of the object may be set.

Depending on the orientation of the object to be gripped, the suction units of the inventive vacuum grip system grip the object on a longitudinal side or on a transverse side. "Transverse side" is understood to mean the shorter side of the object. In order to allow the suction unit to grip the object independent of the side at which the vacuum grip system grasps the object, it is assumed that the gripped side is the transverse side of the object. If the gripped side is in fact a transverse side of the object, the suction units grip the object at the center of that side. However, if the gripped side is a longitudinal side of the object, the suction units grip the object slightly off-center on that side.

According to an advantageous development of the present invention, it is proposed that the vacuum grip system have two suction units, each having at least one suction gripper, for gripping an object, whereby one of the suction units grasps the object from above, and one of the suction units grasps the object from the side. According to this development, the inventive vacuum grip system is thus limited to the gripping of an object. The surfaces of the suction units should be dimensioned so that, on the one hand, they are large enough to hold even large objects securely and reliably, and on the other, they are small enough not to project over the sides of small objects.

Gripping of individual objects having greatly varying dimensions is particularly important, especially in goods distribution centers for supermarkets. There, all the assortments of supermarket goods are sorted by type of good and arranged on pallets. For individual supermarkets, pallets must be prepared with various goods from the goods distribution centers. For this purpose a handling apparatus, for example, may be used having a handling robot or overhead robot, on whose arm is attached a vacuum grip system according to the present invention. Large goods themselves constitute an object that can be gripped by the vacuum grip system. For smaller goods, several goods are packed into one unit of goods, which then constitutes an object.

The vacuum grip system grasps the objects on the pallet from the goods distribution center. The robot maneuvers the vacuum grip system along with the gripped object to a pallet from the supermarket, and the vacuum grip system releases the object there (so-called "pick to pallet"). It is also conceivable for the robot to maneuver the vacuum grip system along with the gripped object to a conveyor belt, where the vacuum grip system releases the object (so-called "pick to belt"). Another robot at the end of the conveyor belt takes the object from the conveyor belt and sets the object down on a pallet from the supermarket.

According to a further advantageous development of the present invention, it is proposed to vary the distance between the suction unit on the top side of the object and the suction unit on the lateral side of the object, such that the suction unit on the lateral side of the object always grasps on the lower area of the object. In this development, an object with any given dimensions is always gripped with the most optimal lifting arm, thus making lifting and holding significantly more secure. This development further ensures that for an object designed as a rectangular carton pallet upon which goods are arranged and bonded to the carton pallet using a plastic film, the suction unit always grasps on the side of the object, and not on the plastic film. The goods arranged on the carton pallet frequently have a shape that deviates from a rectangle, so that the plastic film does not form a flat surface on the side of the object. It is understood that such an object can be gripped much better and more securely on the relatively flat carton pallet than on the plastic film.

According to a preferred embodiment of the present invention, it is proposed that the vacuum grip system for gripping an object have at least two upper suction units and at least two side suction units, each having at least one suction gripper, whereby the distance between the individual suction units parallel to the top side of the object, and/or the distance between the individual suction units parallel to the lateral side, may be varied. In this manner, the effective suction area of the suction units on the top side or lateral side of the object may be increased.

According to a further advantageous embodiment of the present invention, it is proposed that the suction unit on the top side of the object be guided in a vertically-movable fashion at the base unit of the vacuum grip system and be fixable at a certain height, and that the suction unit on the lateral side of the object be attached to the base unit at a fixed height. The suction unit on the top side of the object (upper suction unit) is preferably located at its lowest position before gripping the object. In this position, the suction unit is held either by its own weight or additionally by spring tension. The vacuum grip system according to this embodiment is maneuvered down from above to the object to be gripped. In this manner, the upper suction unit comes to rest against the upper side of the object at a specified time. The vertical position (z position) of the vacuum grip system is determined at that time, and the vacuum grip system is maneuvered further down, depending on the height of the object to be gripped, until the suction unit on the lateral side of the object (lateral suction unit) is situated at the lower area of the object. The upper suction unit is thus displaced upward, relative to the base unit of the vacuum grip system.

As soon as the lateral suction unit has reached the lower area of the object, the upper suction unit is fixed in its position. If a robot is used to maneuver the vacuum grip system, according to this embodiment of the invention the vertical displacement of the upper suction unit is thus effected passively, that is, without a displacement means, but rather by maneuvering of the robot.

Alternatively, it is proposed that the suction unit on the top side of the object be fastened to the base unit of the vacuum grip system at a fixed height, and that the suction unit on the lateral side of the object be guided in a vertically-movable fashion at the base unit and be fixable at a certain height. The lateral suction unit is preferably situated in its highest position before grasping the object. The vacuum grip system according to this alternative embodiment is maneuvered down from above to the object to be gripped. In this manner, the upper suction unit comes to rest against the upper side of the object at a specified time. The vertical position (z position) of the vacuum grip system is determined at that time, and the lateral suction unit is maneuvered downward, depending on the height of the object to be gripped, until the lateral suction unit is situated at the lower area of the object.

Vertical displacement of the suction unit on the top side of the object, or of the suction unit on the lateral side of the object, is achieved according to another embodiment of the invention by a displacement means. The displacement means is preferably constructed as at least one pneumatic cylinder that is disposed between the base unit of the vacuum grip system and the suction unit. Alternatively, it is proposed to construct the displacement means as an electric motor that vertically displaces the suction unit by means of a gear arrangement.

As soon as the lateral suction unit reaches the lower area of the object, the suction unit is brought to rest against the side of the object. For this purpose, according to a preferred embodiment of the present invention it is proposed to guide the suction unit on the top side of the object, displaceable parallel to the top side, at the base unit of the vacuum grip system. In order to bring the lateral suction unit to rest against the side of the object, the entire vacuum grip system is displaced in the direction to the side of the object until the lateral suction unit contacts the side of the object. The upper suction unit is thus displaced parallel to the top side of the object.

Alternatively, it is proposed to guide the suction unit on the lateral side of the object, displaceable perpendicular to the lateral side, at the base unit of the vacuum grip system. In order to bring the lateral suction unit to rest against the side of the object, the lateral suction unit is displaced in the direction to the side of the object until the lateral suction unit contacts the side of the object.

As soon as the suction units contact the top side or lateral side, respectively, of the object, the suction units can be fixed in their positions and the suction grippers can be evacuated. The object is gripped and held securely by the vacuum grip system according to the invention. The gripped object can be lifted by appropriate movements of a robot on whose arm is attached the vacuum grip system.

According to a further advantageous development of the present invention, it is proposed to affix to the base unit of the vacuum grip system a mechanical undergripper that is at least partially displaceable underneath at least one of the objects lifted by the suction unit. As soon as the undergripper is pushed thereunder, the lifted objects can be set down on the undergripper. Since the location (position and orientation) of the undergripper is known, after the object is set down on the undergripper the angle of wobble of the object about the axes that run parallel to the top side of the object can be determined. More precisely, the angle of wobble about the x-axis (angle of wobble c) and about the y-axis (angle of wobble b) can be determined. The suction units are relieved when the object is set down on the mechanical undergripper. The suction units now perform only a holding function; that is, they hold the objects on the undergripper during the handling motions of the robot. The suction units need no longer perform a support function, that is, to support the full weight of the objects. By the use of the mechanical undergripper, the objects can be held and handled significantly more securely and reliably by the vacuum grip system.

The vacuum grip system according to this development has a base unit and at least one suction unit affixed to the base unit, each suction unit having at least one suction gripper. This vacuum grip system as well has suction units, advantageously disposed at right angles to one another, at the top side of the object or at one lateral side of the object, the distance between the suction units being adjustable. Even without these features, the vacuum grip system with the mechanical undergripper has the stated advantages of the characteristics of claim 1. Protection of the patent, therefore, should relate to a vacuum grip system of the latter described art having only one suction unit, and for which the listed features are lacking in the characteristics of claim 1.

According to a preferred embodiment of the present invention, it is proposed that the depth of the telescoping motion of the undergripper be variable. Additionally or alternatively, it is proposed that the width of the undergripper be variable. To vary the width of the undergripper, it is proposed that the undergripper be constructed as a lattice grate. As a further option for varying the width of the undergripper, it is proposed that the undergripper be constructed as a plate that is divided into at least two longitudinal partial plates that can be moved under, over, or into one another.

As a final option for varying the width of the undergripper, it is proposed that the undergripper be constructed as a fork having at least two tines, whereby the distance between the tines may be adjusted to vary the width of the undergripper. The undergripper is preferably constructed as a fork having at least two tines, whereby the tines can be sequentially telescoped outwardly or inwardly. The depth of the telescoping motion of the individual tines may be varied.

For flexible objects, a combination of tines on the undergripper whose distance may be varied and which may be sequentially telescoped outwardly offers considerable advantages. For flexible objects, the side of the object lifted by the vacuum grip system might not be lifted over its entire width, but instead might still lie on its edge, for example, on the support surface.

First, the distance between the tines is set to a small value. Then, one or several of the tines are telescoped outwardly under the lifted part of the object. Then the distance between the tines under the object is increased, whereby the tines slide along the underside of the object. The areas of the object that previously had lain on the support surface are thus lifted.

To simplify pushing the undergripper under the object, according to a advantageous development of the invention it is proposed that the undergripper have on its top side a means for reducing friction between the undergripper and the object, at least while the undergripper is being pushed under the object. The friction-reducing means can be designed, for example, as a specialized coating on the surface, at least on the top side of the undergripper. The means may also be designed as rollers or balls that are affixed to the top side of the undergripper and rotatably mounted.

According to a preferred embodiment of the invention, it is proposed that the vacuum grip system have a means for moving the object onto the undergripper. According to this embodiment, the undergripper is not pushed under the object, but rather, the object moves onto the undergripper. The movement means is designed, for example, as driven rollers or balls, or as a conveyor belt on the top side of the undergripper.

So that the mechanical undergripper does not collide with other objects on the pallet during palletizing or depalletizing, according to a further preferred embodiment of the invention it is proposed that the width of the undergripper be less than or equal to the width of the object lifted by the suction units.

According to a further advantageous development of the present invention, it is proposed that the vacuum grip system have an identification means for determining the width of the lateral side of the lifted object on which the suction unit grasps. Depending on the width of the object, the width of the mechanical undergripper can be adjusted. Also, if the dimensions of the gripped object are known, based on the width of the object that is determined by the identification means, the particular orientation of the object, that is, whether the object was gripped on a transverse side or on a longitudinal side, can be checked. If the gripped side is the longitudinal side of the object, the suction units can reach around to grasp the object closer to the center of the gripped side. In this manner, it can be assured that the object grasped by the suction units is completely lifted on the gripped side, thus allowing the mechanical undergripper to be easily pushed under the object.

According to a further preferred embodiment of the present invention, it is proposed that the identification means have a plurality of tracer pins adjacently arranged and swivelable about a common rotational axis, whereby a portion of the tracer pins contacts the surface of the object lifted by the suction units, and the other portion of the tracer pins are swiveled down next to the object. The axis of rotation of the tracer pins preferably runs parallel to the gripped side of the object. Furthermore, the axis of rotation preferably runs as high as the top side of the gripped object. The width of the gripped side of the object can be determined from the swivel position of the individual tracer pins. The more tracer pins the identification means has, the more accurately the width of the gripped side can be determined.

According to yet another preferred embodiment of the present invention, it is proposed that the undergripper, as a result of its own weight or by a displacement means, is guided in a vertically-movable fashion at the base unit of the vacuum grip system. Before the undergripper is pushed under the lifted object, the undergripper is moved to the correct vertical position so that the undergripper will fit in the gap between the underside of the lifted object and the former support surface of the object. The z position of the top side of the object is known from the vertical position of the upper suction gripper. If the dimensions of the object are also known, the correct vertical position of the undergripper can be determined.

Advantageously, at the base unit of the vacuum grip system a stop, which is vertically displaceable and fixable at a specified height, is guided that limits displacement of the undergripper from below. The stop is moved to a vertical position and fixed in the position such that the undergripper comes to rest on the stop at the correct vertical position. The undergripper preferably moves automatically as a result of its own weight until it comes to rest against the support on the stop.

Alternatively, it is proposed to effect vertical displacement of the undergripper or stop by a displacement means. The displacement means is preferably constructed as at least one pneumatic cylinder that is disposed between the base unit of the vacuum grip system and the undergripper, or between the base unit and the stop. Alternatively, it is proposed to design the displacement means as an electric motor that vertically displaces the undergripper or the stop by means of a gear arrangement.

By means of the upper suction unit and the mechanical undergripper, it is already possible to determine the vertical position and two angles of wobble of the object. In order to allow further handling (for example, palletizing by "pick and pallet") of the gripped object, the location of the object must be known. In order to determine the location of the object, the transverse and longitudinal positions and the rotational angle of the object also must be determined. To this end, according to an advantageous development of the present invention it is proposed that the vacuum grip system have fine localization means to arrange the lifted object in a predetermined location. Preferably, the fine localization means is constructed as two flat stop elements, disposed at right angles to one another and at a right angle to the undergripper, which are affixed to the base unit of the vacuum grip system, whereby the sides of the object may be moved to rest against the surfaces of the stop elements.

As an alternative method of determining the location of the object, it is proposed that the vacuum grip system have fine localization means to determine the location of the object to be gripped. Advantageously, the fine localization means is constructed as two flat stop elements, disposed at right angles to one another and at a right angle to the undergripper, mounted on the base unit of vacuum grip system, whereby the surfaces of the stop elements may be moved to rest against the sides of the object, and means for determining the swivel position of the stop elements are provided. The means for determining the swivel position of the stop elements are preferably designed as path sensors, whereby it is preferred that one path sensor is respectively affixed on each stop element, on both sides of the vertical axis, between the stop element and the base unit of the vacuum grip system. Complete fine localization of the object may be performed with a total of three path sensors on both stop elements; that is, with two path sensors on one of the stop elements and one path sensor on the other stop element.

It is conceivable to construct the fine localization means not as a part of the vacuum grip system, but rather, independently of the vacuum grip system. For fine localization, the gripped object could be transported to the fine localization means, for example by maneuvering the robot or by a conveyor belt upon which the object is set down by the vacuum grip system, whereupon fine localization is performed.

To simplify the vacuum grip system according to the invention, it is proposed that the suction unit on the lateral side of the object be constructed as one of the flat stop elements of the fine localization means. It is further proposed that at least one of the flat stop elements be swivel-mounted on the base unit of the vacuum grip system, between an operating position and a rest position.

Preferably, the stop element forming the lateral suction unit is not swivel-mounted. The other stop element, on the other hand, is swivel-mounted, and can be swiveled to a position wherein the stop element does not interfere with gripping and lifting of the object, pushing down the undergripper, and setting the object down on the undergripper, as long as the stop element is not needed.

According to a preferred embodiment of the present invention, it is proposed that the fine localization means be constructed as tracer sensors. At least three each of the tracer sensors are arranged in two planes that are disposed at right angles to one another. The tracer sensors may brought to rest against the sides of the object to be gripped. To this end, either the tracer sensors may be moved to the sides of the object to be gripped, or the object to be gripped may be moved to the tracer sensors. The tracer sensors can be actively moved to the sides of the object, using displacement means. Alternatively, the tracer sensors can be displaced passively, using a handling robot. For this purpose, the tracer sensors, together with the vacuum grip system, are moved by the handling robot to the sides of the object to be gripped until they come to rest against the sides. The vacuum grip system according to the proposed embodiment also has a means for evaluating the output signals of the tracer sensors. As soon as the tracer sensors make contact with the sides of the object to be gripped, the output signals of the tracer sensors change. When all tracer sensors have made contact with the sides of the object, the transverse and longitudinal positions and angle of rotation, and thus the location, of the object to be gripped can be determined. With the proposed embodiment, fine localization of the object can be performed, even before the object is lifted or set down on the undergripper.

According to yet another advantageous development of the present invention, it is proposed that the vacuum grip system have a sensor for selecting one of the objects to be gripped by the suction units of the vacuum grip system, from objects arranged on a pallet, and for rough localization of the selected object. The sensor performs rough localization of the selected object before fine localization or before the actual gripping operation. The object is thereby localized with an accuracy of several centimeters. It is also conceivable to affix the sensor not directly to the vacuum grip system, but rather to the robot arm.

According to a preferred embodiment of the present invention, it is proposed that the sensor be designed as a laser sensor that scans over the objects on the pallet with a laser beam, whereby means is provided to detect the transit time of the laser beam, so that from the transit time the shape of the surfaces of the objects arranged on the pallet may be determined, and that the object to be gripped by the suction units of the vacuum grip system may be selected from the objects arranged on the pallet, according to a specified ranking order. The laser sensor scans obliquely from above, ideally at a scanning angle of approximately 45°, over the surface of the pallet. For rough localization, however, satisfactory results are still obtained with a scanning angle of approximately 20°. The arrangement of objects on the pallet can be determined from the shape of the surfaces of objects arranged on the pallet, when the dimensions of the objects are known. An object is selected from the objects arranged on the pallet according to a specified ranking order.

The object is preferably selected according to the ranking order of upper, front, right. That is, the objects arranged uppermost on the pallet are selected first. Of these upper objects, those that lie closest to the front are then selected. Of these upper, front objects, the object lying farthest to the right is then selected. The vacuum grip system thereby affords particularly good accessibility of objects on the pallet. From the upper, front objects, those that lie farthest to the left could also be selected without limiting accessibility.

For rough localization of the selected object, according to a preferred embodiment it is proposed that the objects have an essentially rectangular design, and that the sensors roughly localize the location (position and orientation) of the edges at the upper, front, right corner of the selected object. These three edges form a tripod by which the location of the corner of the selected object is unambiguously determined. However, this locational determination of the corner can only serve as a rough localization. Fine localization is performed following rough localization by gripping and setting the object down on the undergripper, as described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given byway of illustration only, and thus are not limitative of the present invention, and wherein.

DETAILED DESCRIPTION OF THE PREFERRED EMBODIMENTS

Figure 1:
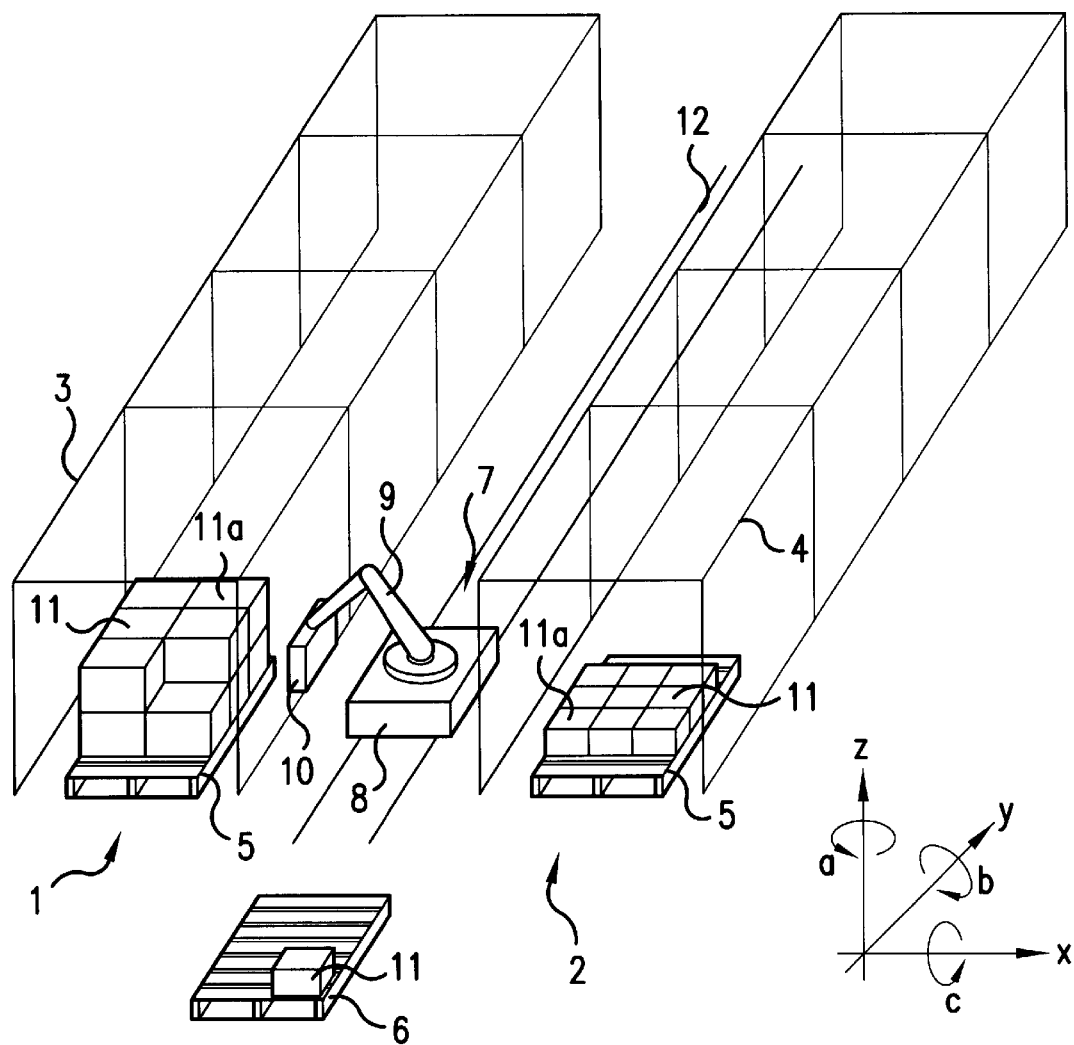
FIG. 1: Section of a goods distribution center wherein a handling apparatus, with a vacuum grip system according to the invention, is used for handling objects.
Figure 2:
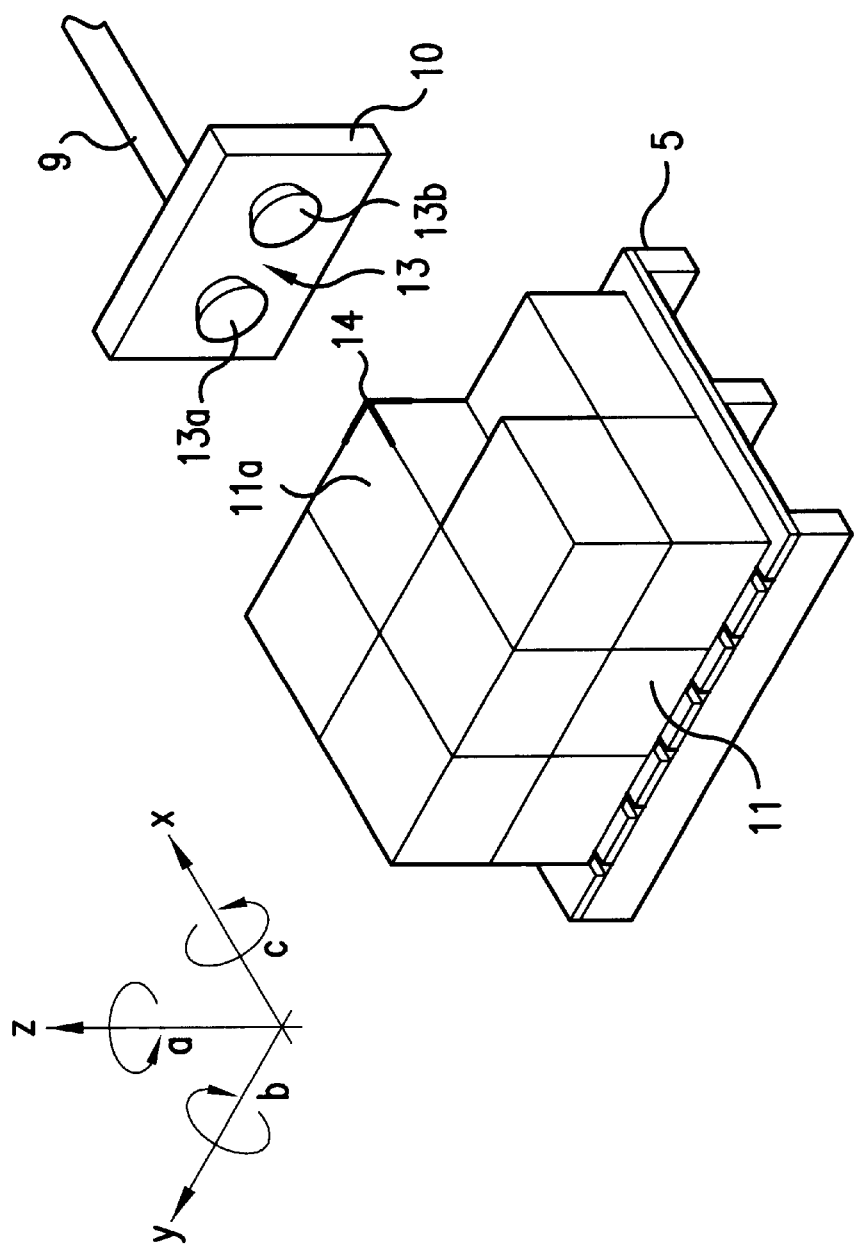
FIG. 2: Section of a pallet from the goods distribution center, using the components of the vacuum grip system according to the invention for selection and rough localization of an object to be gripped.
Figure 3:
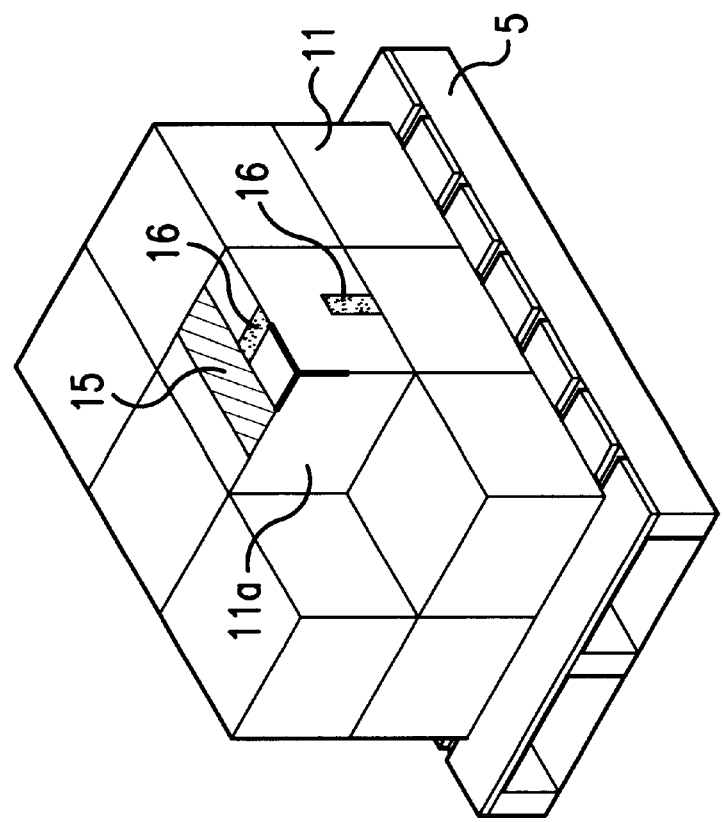
FIG. 3: The pallet from FIG. 2 with a selected and roughly localized object.
Figure 3:
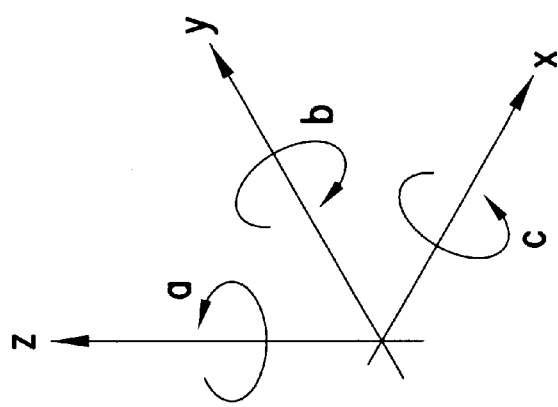
Figure 4:
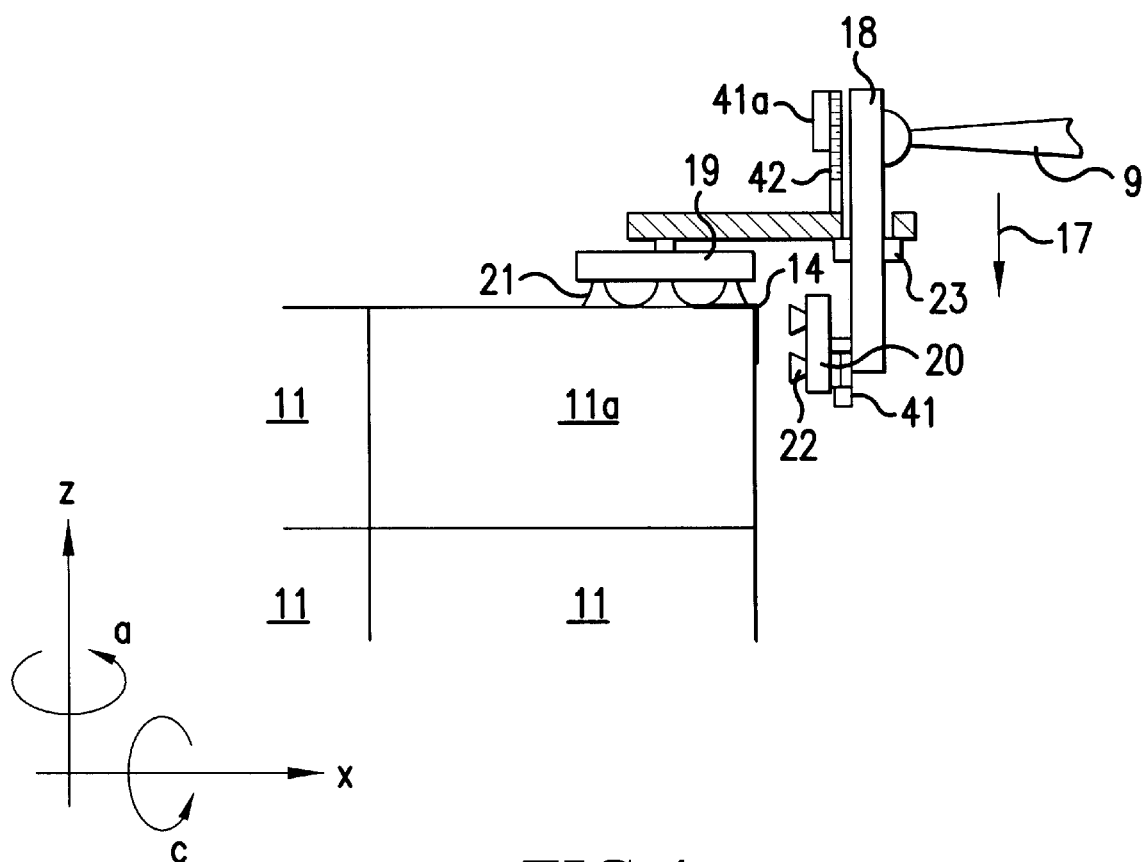
FIG. 4: A first step of the gripping operation, using the vacuum grip system according to the invention.

FIG. 1 shows two shelf rows 1, 2 of a goods distribution center for supermarkets. The goods distribution center typically has a large storage room in which a plurality of shelf rows as illustrated in FIG. 1 are arranged next to one another. Shelves 3, 4 of the shelf rows 1, 2 contain goods from the supermarket assortment, sorted by type of goods, on pallets 5. The pallets 5 are set down on a single level in the shelves of the shelf rows 1, 2. Alternatively, the pallets 5 can also be set down in several levels on an overhead shelf (not shown).

Pallets 6 with various goods from the goods distribution center are prepared for delivery to supermarkets. To this end, a handling apparatus 7 is used that has a maneuverable handling robot 8, on whose arm 9 is affixed a vacuum grip system 10 according to the invention. The vacuum grip system 10 is depicted in FIG. 1 only as a symbol. For simplicity, FIGS. 2 through 7 show only the components of the vacuum grip system 10 that are described in the appropriate figure description. However, the vacuum grip system 10 according to the invention can have all the components shown in FIGS. 2–7.

The vacuum grip system grasps essentially rectangular objects 11 having differing dimensions. Larger goods (such as boxes of detergent or bags of cat litter) themselves constitute an object 11 that can be gripped by the vacuum grip system 10. For smaller goods (such as confections or cosmetics), several individual goods are packaged into a goods unit that then constitutes an object 11. However, an object 11 can also be a carton pallet upon which individual goods (such as beverage cans) are arranged and bonded to the carton pallet with a plastic film. Due to the differing dimensions, organizational units (carton, bag, sack, carton pallet) and properties (rigid, flexible) of the object 11, the vacuum grip system 10 used in a goods distribution center should particularly be able to flexibly grip and to hold all gripped objects 11 securely and reliably.

Between shelf rows 1, 2 run guide rails 12 to guide the handling robot 8 during its maneuvering motions. The constellation shown in FIG. 1 comprising removal of objects 11 from first pallets 5 (depalletizing) and setting the removed objects 11 onto a second pallet 6 (palletizing) is also referred to as "pick to pallet." In contrast, for so-called "pick to belt" (not shown), the removed objects 11 are laid on a conveyor belt. At the end of the conveyor belt, the objects 11 are then laid on a second pallet, using an additional handling apparatus.

"Pick to pallet" of the objects 11 laid on the pallets 5 is carried out in two principal steps. First, rough localization of the objects to be gripped 11 is performed with an accuracy of several centimeters. Then, fine localization of the gripped object 11 is performed with an accuracy of a few millimeters.

Lists of goods designated for individual supermarkets are stored in a central computer (not shown). In addition, the central computer stores information detailing the pallets 5 on which individual goods are laid, and the dimensions of individual objects. The handling apparatus 7 travels in front of the pallet 5, on the shelf 3, upon which the first goods on the list in the central computer are laid.

A laser sensor 13 (see FIG. 2) is arranged on the vacuum grip system 10. The laser sensor selects an object to be gripped 11a from the objects 11 arranged on the pallet 5. The laser sensor also performs rough localization of the selected object 11a. The laser sensor 13 has a transmitting unit 13a and a receiving unit 13b. The laser sensor is obliquely positioned over the objects 11 on the pallet 5 at an angle of preferably 45° (in the present embodiment example, at an angle of approximately 20°), and scans over the objects 11 with a laser beam. By comparing the laser beam emitted from transmitting unit 13a with the laser beam received by the receiving unit 13b, the transit time of the laser beam can be determined. From the transit time of the laser beam, the shape of the surfaces of the objects 11 arranged on the pallet 5 can be determined. Such laser sensors are available, for example, from Sick AG, Sebastian-Kneipp-Straβe 1, 79183 Waldkirch, Germany, under the description "light section sensor DMH." It is known to those skilled in the art that, instead of a laser sensor 13, other sensors, in particular other optical sensors, may also be used.

The arrangement of objects 11 on the pallet 5 can be determined from the shape of the surfaces of the objects 11 arranged on the pallet 5 when the dimensions of the objects on the pallet are known. The object 11a to be gripped is then selected by the vacuum grip system, depending on the arrangement of the objects 11 on the pallet 5, according to a specified ranking order. The object to be gripped 11a is selected according to the ranking order of upper, front, right. That is, the objects 11 arranged uppermost on the pallet 5 are selected first. Of these upper objects 11, those that lie closest to the front are then selected. Of these upper, front objects 11, the object 11 lying farthest to the right is then selected. It is known to those skilled in the art that also the object lying farthest to the left could be selected from the upper, front objects 11, without limiting accessibility.

For rough localization of the selected object 11a, the location (position and orientation) of the edges at the upper, front, right corner 14 of the selected object 11a is roughly localized. These three edges, shown in more detail in FIG. 2, form a tripod by which the location of the corner of the selected object 11a is unambiguously determined.

After rough localization of the object 11a to be gripped is completed, the vacuum grip system 10 can now grip the object 11a. Since the orientation of the object 11a, that is, whether a longitudinal side or a transverse side of the object 11a is arranged in front, is not known, it is also not known whether the object 11a is to be gripped on a longitudinal side or transverse side. The side of the object 11a on which the vacuum grip system grasps the object 11a is denoted as the "front." The longer side of the object 11a is denoted as the "longitudinal side," and the shorter side of the object 11a is denoted as the "transverse side." In order to always assure the secure gripping by the vacuum grip system 10, on the top side of the object 11a is defined a surface 15 (shown in FIG. 3 in crosshatching) whose edge lengths correspond to the length of the transverse sides of the object 11a. The vacuum grip system 10 grasps the object 11a at the marked locations 16. The locations 16 lie approximately in the center of the transverse sides, and somewhat off-center on the longitudinal sides.

The vacuum grip system 10 has a base unit 18 (see FIG. 4) and two suction units 19, 20 affixed thereto. The suction units 19, 20 are disposed at right angles to one another (so-called angled grippers). The suction unit 19, which has six suction grippers 21 arranged in two rows of three adjacent suction grippers 21 each, grasps the object 11a from the top side. The suction unit 20, which has four suction grippers 22 arranged in two rows of two adjacent suction grippers 22 each, grasps the object 11a from the lateral side. Suction grippers 21, 22 of suction units 19, 20 can be constructed as flat suction grippers, accordion-pleated suction grippers, or specialized suction grippers.

The upper suction unit 19 is guided in a vertically-movable fashion at the base unit 18 of the vacuum grip system 10 and is fixable at a certain height. The lateral suction unit 20 is attached to the base unit 18 at a fixed height, on the side of the object 11a. Before gripping, the upper suction unit 19 is situated at its lowest position. In this position, the suction unit is held by its own weight on a stop 23 of the base unit 18. To grip the object 11a, the vacuum grip system 10 is maneuvered from above (arrow 17 in FIG. 4) down to the object 11a. In this manner, the upper suction unit 19 comes to rest against the top side of the object 11a at a specified time. The vertical position of the suction unit 19 is determined at that time as the z position of the object 11a.

Depending on the height of the object 11a to be grasped, the vacuum grip system 10 is maneuvered farther down in the direction of the arrow 17 until the lateral suction unit 20 is located in the lower area of the object 11a. The upper suction unit 19 is thus upwardly displaced, relative to the base unit 18 of the vacuum grip system 10.

The lateral suction unit 20 is then brought to rest against the side of the object 11a. To this end, the upper suction unit 19 is displaceably guided, parallel to the top side, at the base unit 18 of the vacuum grip system 10. By use of the handling robot 8, the entire vacuum grip system 10 is displaced in the direction of the lateral side of the object 11a until the lateral suction unit 20 contacts the side of the object. The upper suction unit 19 is thus displaced, relative to the base unit 18 and parallel to the top side of the object 11a. As soon as the suction units 19, 20 are brought to rest against the top side or lateral side of the object 11a, the upper suction unit 19 is fixed in its position, and the suction units 19, 20 are evacuated.

The vacuum grip system 10 according to the invention has the advantage that the distance between the upper suction unit 19 and the lateral suction unit 20 can be increased, provided that the dimensions of the object or objects 11a to be gripped permit this. The object 11a is thereby gripped with a large lifting arm between the suction units 19, 20, thus enabling significantly more secure lifting and holding. In addition, the invention assures that for an object 11a that is constructed as rectangular carton pallet upon which goods are arranged and bonded to the carton pallet by means of a plastic film, the lateral suction unit 20 always grasps the carton pallet, and not the plastic film. The goods arranged on the carton pallet frequently have a shape that deviates from a rectangle, so that the plastic film does not form a flat surface on the side of the object.

It is understood that such an object 11a can be gripped much better and more securely on the relatively flat carton pallet than on the plastic film.

Figure 5:
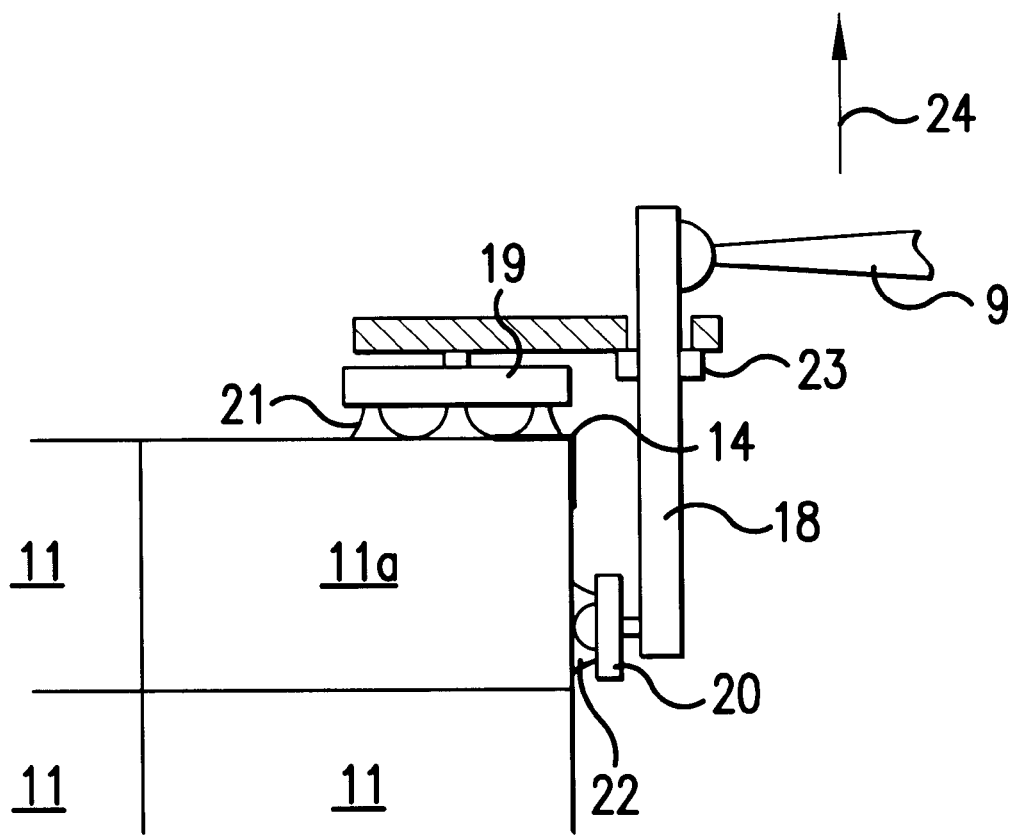
FIG. 5: A second step of the gripping operation, using the vacuum grip system according to the invention.
Figure 6:
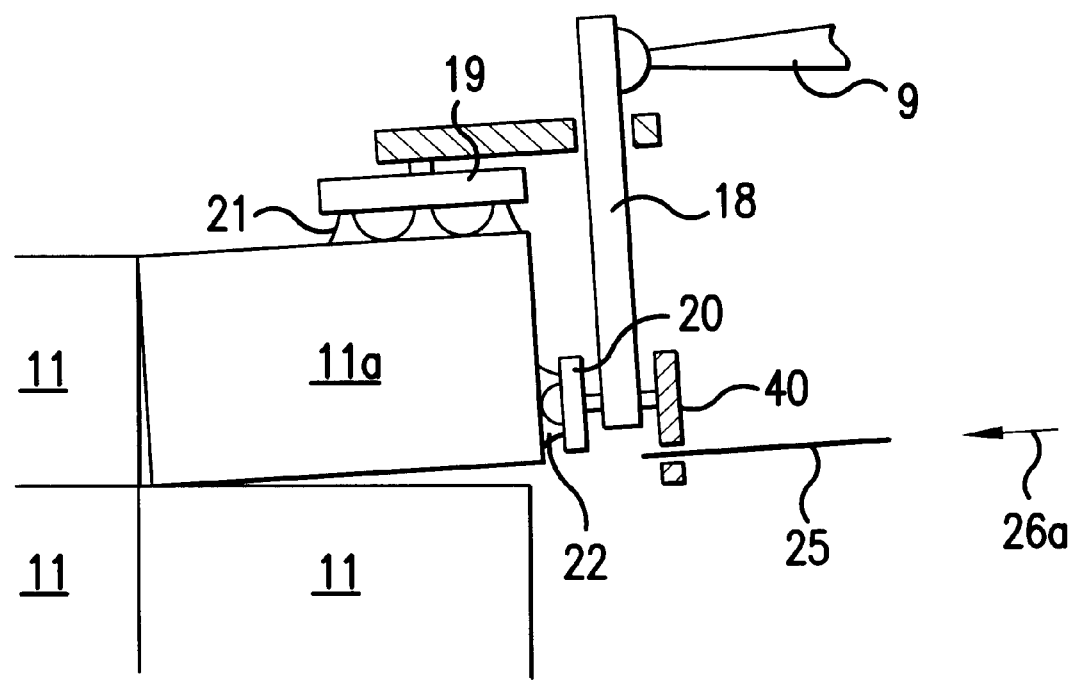
FIG. 6: A third step of the gripping operation, using the vacuum grip system according to the invention.
Figure 7:
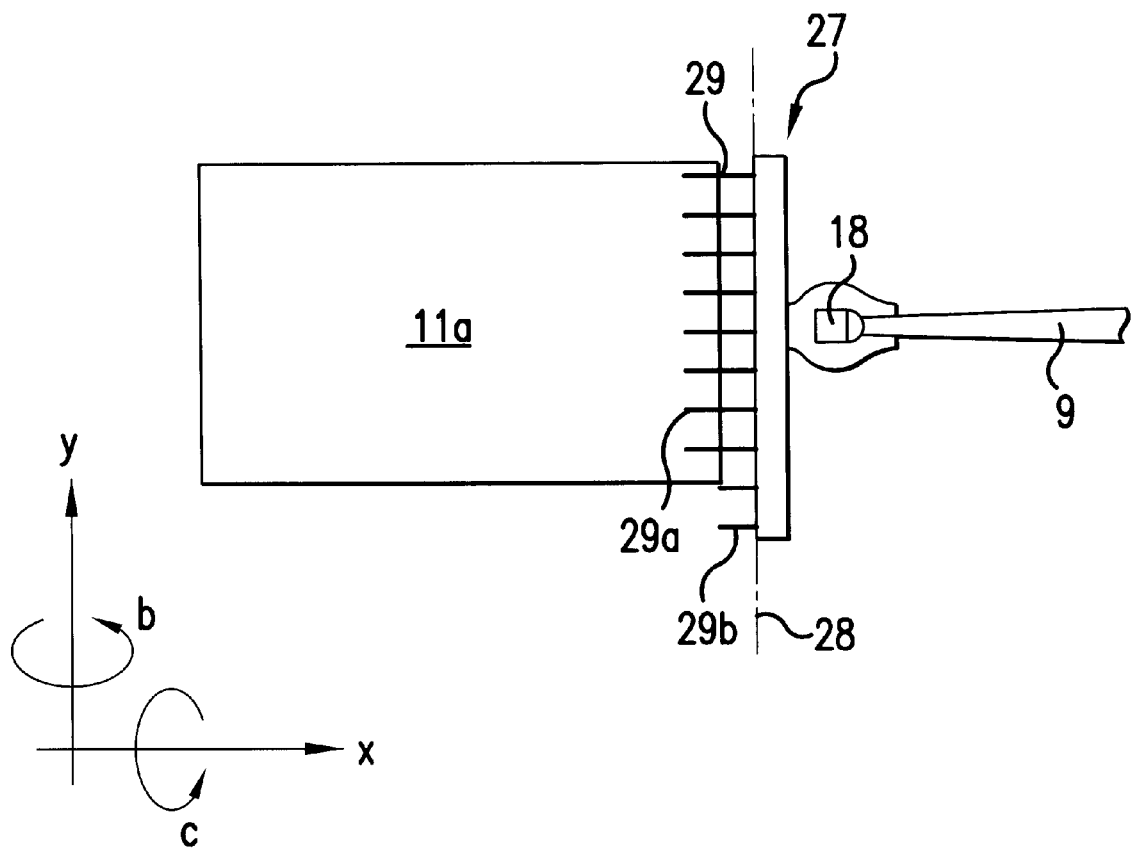
FIG. 7: Identification means for determining the width of the side of the lifted object.

The object 11a is held against the evacuated suction grippers 21, 22 of the suction units 19, 20. This situation is depicted in FIG. 5. In order to lift the object 11a, the vacuum grip system 10 is maneuvered upward (arrow 24) by use of the handling robot 8. The base unit 18 of the vacuum grip system 10 is affixed to (FIG. 8) or slidably engaged with (FIG. 6) a mechanical undergripper 25 (via a support unit 40 for example, see FIG. 6), which undergripper is at least partially movable under the lifted object 11a (arrow 26a). As soon as the undergripper 25 is pushed under the lifted object 11a, the object 11a is set down on the undergripper 25. Since the location (position and orientation) of the undergripper 25 is known, after the object 11a is set down on the undergripper 25, the angles of wobble b, c of the object 11a about the y-axis or the x-axis can be determined.

The suction units 19, 20 are relieved when the object 11a is set down on the mechanical undergripper 25. The suction units now perform only a holding function; that is, they hold the object 11a on the undergripper 25 during the handling motions of the handling robot 8. The suction units need no longer perform a support function, that is, to support the full weight of the object 11a. By use of the mechanical undergripper 25, the object 11a can be held and handled significantly more securely and dependably by the vacuum grip system.

Figure 9:
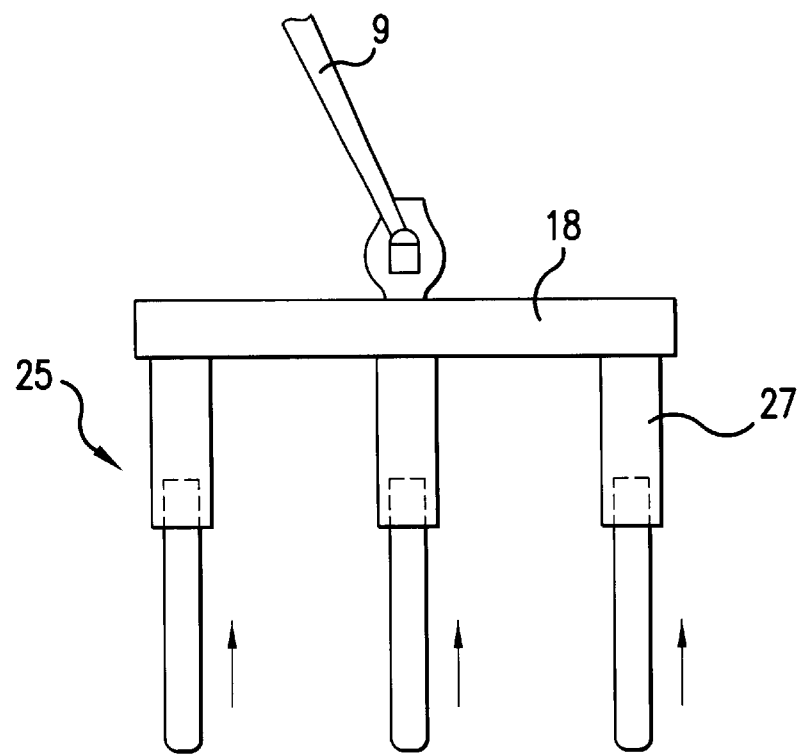
FIG. 9: A telescoped embodiment of an undergripper with tines telescoped outwardly.
Figure 10:
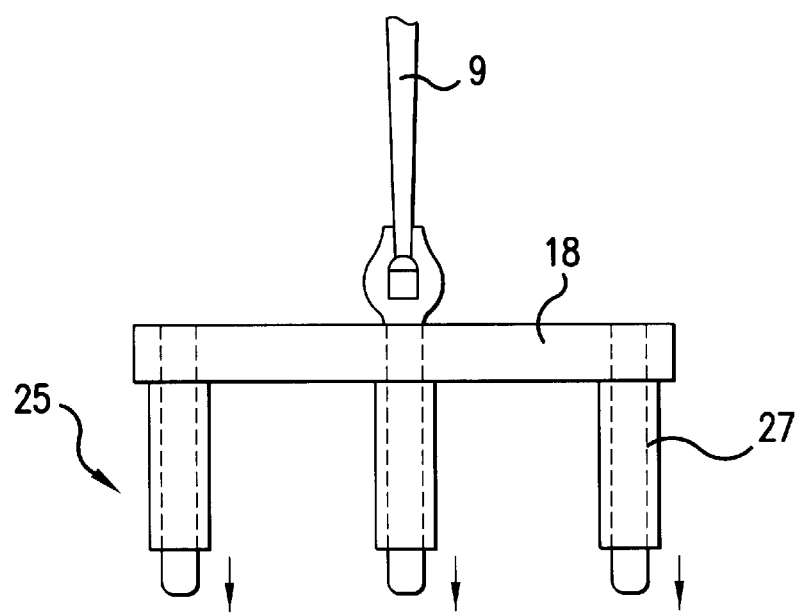
FIG. 10: The telescoped embodiment of FIG. 9, with the tines telescoped inwardly.
Figure 11:
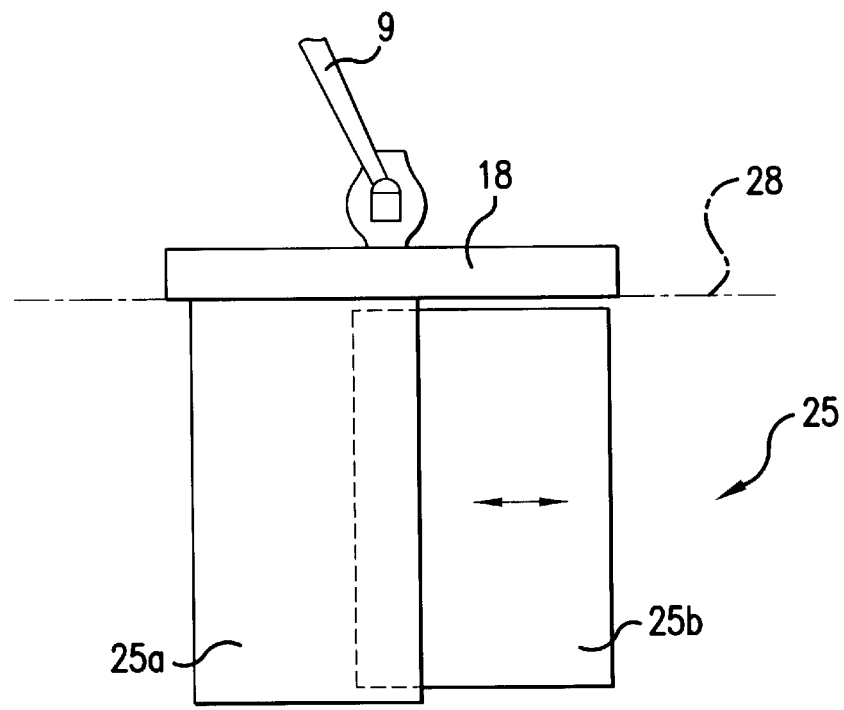
FIGS. 11 and 12: Top and bottom views respectively of a divided plate unergripper embodiment.
Figure 12:
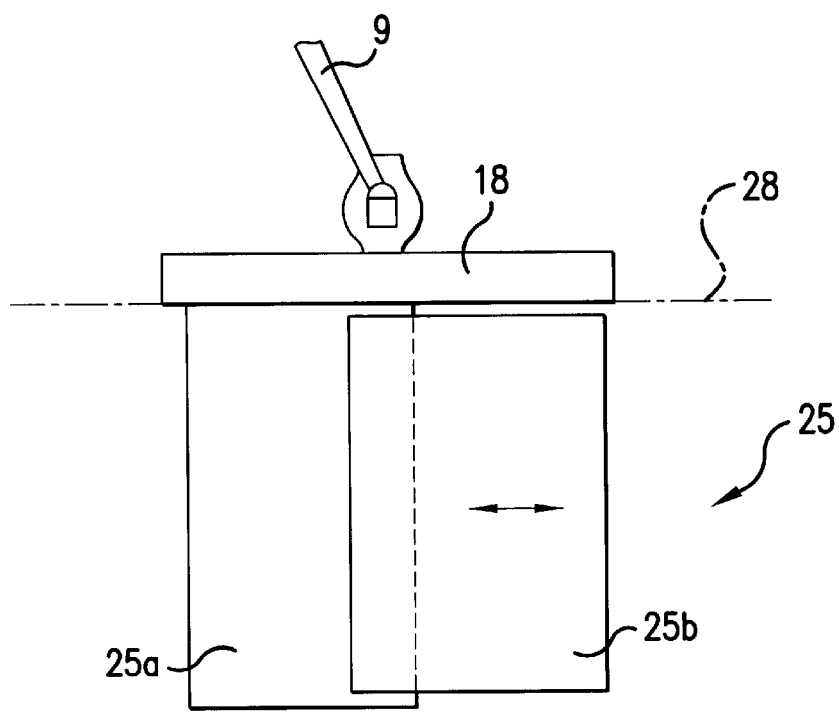

The undergripper 25 can be constructed as a fork, whereby the distance between the tines 26 (see FIG. 8) may be changed to vary the width of the undergripper 25. The tines 26 of the undergripper 25 can be sequentially telescoped outwardly or inwardly (FIGS. 9 and 10). The depth of the telescoping motion of the tines 26 may be varied. Alternatively, the undergripper 25 can also be constructed as a lattice grate that can be pushed together or pulled apart, or as a plate (see FIGS. 11 and 12) that is divided into at least two longitudinal partial plates that can be moved under, over, or into one another.

The mechanical undergripper 25 is guided in a vertically-movable fashion at the base unit 18 of the vacuum grip system 10. Before the undergripper 25 is pushed under the lifted object 11a, the undergripper is pushed to the correct vertical position so that the undergripper will fit in the gap between the underside of the lifted object 11a and the former support surface of the object 11a.

The vacuum grip system 10 also has an identification means 27 (see FIG. 7) for determining the width of the lateral side of the lifted object 11a on which the lateral suction unit 20 grasps. The identification means 27 has a plurality of tracer pins 29 adjacently arranged and swivelable about a common rotational axis 28.

A portion 29a of the tracer pins 29 contacts the surface of the lifted object 11a, and the other portion 29b of the tracer pins 29 are swiveled down next to the object 11a. The axis of rotation 28 of the tracer pins 29 preferably runs parallel to the gripped side of the object 11a, and as high as the top side of the gripped object 11a. The width of the gripped side of the object 11a can be determined from the swivel position of the individual tracer pins 29. The width of the mechanical undergripper 25 can be adjusted as a function of the width of the object 11a.

Also, based on the width of the gripped side of the object 11a that is determined by the identification means 27, the particular orientation of the object 11a, that is, whether the object was gripped on a transverse side or on a longitudinal side, can be checked. If the gripped side is the longitudinal side of the object 11a, the suction units 19, 20 can reach around to grasp the object 11a closer to the center of the gripped side. In this manner, it can be assured that the grasped object 11a is completely lifted on the gripped side, thus allowing the mechanical undergripper 25 to be easily pushed under the object 11a.

It is understood by those skilled in the art that the suction units 19, 20 may be displaced not only passively by using the handling robot 8, but also actively by using a displacement means. Likewise, the vertical position of the undergripper 25 can also be actively adjusted using a displacement means. The displacement means is constructed, for example, as a pneumatic cylinder 41 that is arranged between the base unit 18 of the vacuum grip system 10 and the suction units 19, 20, or between the base unit 18 and the undergripper 25. Alternatively, the displacement means can be constructed as an electric motor 41a that displaces the suction units 19, 20 or the undergripper 25 by means of a gear arrangement 42.

By use of the upper suction unit 19 and the mechanical undergripper 25, it is already possible to determine the z position of the top side of the object 11a and two angles of wobble b, c of the object 11a. In order to allow further handling (for example, palletizing by "pick and pallet") of the gripped object 11a, the location of the object 11a must be completely known.

Figure 8:
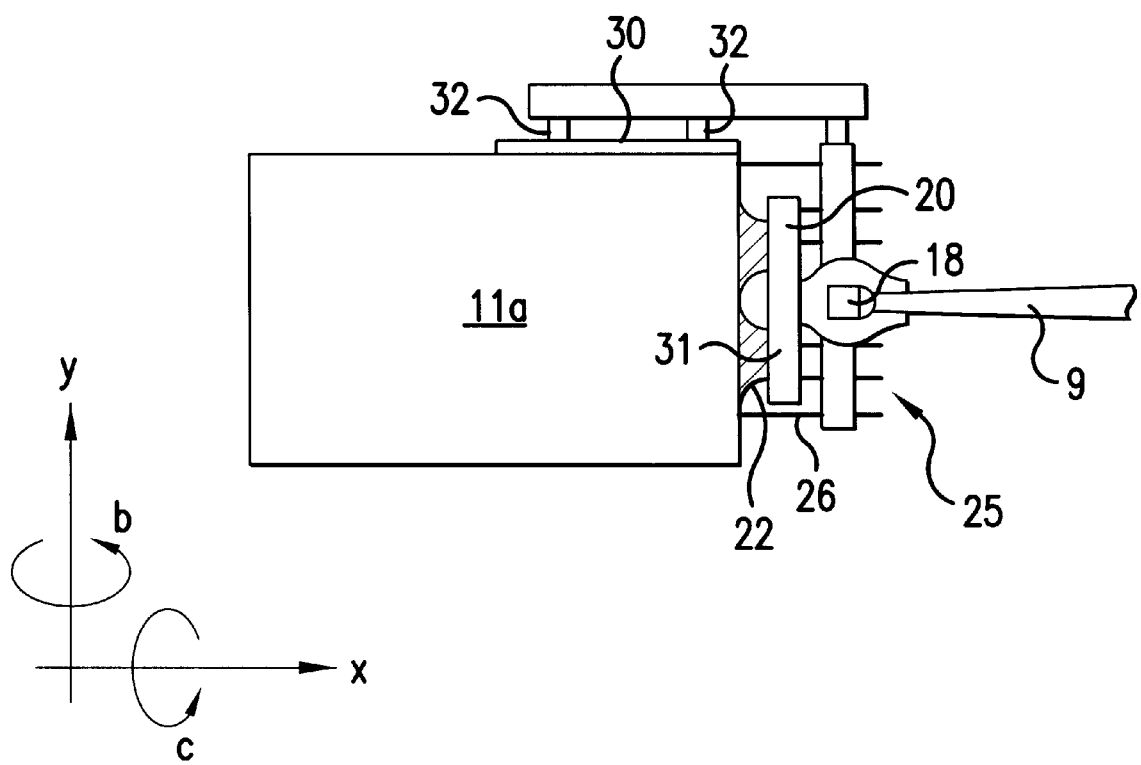
FIG. 8: Fine localization means for fine localization of the gripped object.

In order to additionally determine the transverse position (y position) and longitudinal position (x position), as well as the rotational angle a of the object 11a, the vacuum grip system 10 has a fine localization means (see FIG. 8). The fine localization means is constructed as two flat stop elements 30, 31 disposed at right angles to one another and at a right angle to the undergripper 25. The stop elements 30, 31 are swivel-mounted at the base unit 18 of the vacuum grip system 10 about the vertical axes (z axes) of the stop elements. The lateral suction unit 20 (see FIGS. 4–6) is constructed as the flat stop element 31. The surfaces of the stop elements 30, 31 are brought to rest against two sides of the object 11a. To determine the swivel position of the stop elements 30, 31 about their vertical axes, path sensors 32 are provided, whereby a path sensor 32 is respectively affixed to the stop element 30, on both sides of the vertical axis, between the stop element 30 and the base unit 18 of the vacuum grip system 10, and only one path sensor 32 is affixed to the stop element 31, to one side of the vertical axis. The angle of rotation a of the object is determined from the swivel position of the stop elements 30, 31.

The flat stop element 30 is swivel-mounted on the base unit 18 of the vacuum grip system 10, between an operating position (see FIG. 8) and a rest position. In the rest position, the stop element 30 does not interfere with gripping and lifting of the object 11a, pushing the undergripper 25 under, and setting the object 11a down on the undergripper 25. The stop element 30 is then swiveled to its operating position for fine localization.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

For fine localization, the surfaces of the stop elements 30, 31 are brought to rest against two sides of the object 11a. To this end, either the object 11a is moved toward the stop elements 30, 31, or the stop elements 30, 31 are moved toward the sides of the object 11a. Since the x position of the stop element 31 and the y position of the stop element 30 are known, the x position and y position of the object 11a can be determined for the object 11a lying on the stop elements 30, 31.

What is claimed is:

1. A vacuum grip system for gripping at least one object, wherein said vacuum grip system has a base unit and at least two suction units that are separately affixed to the base unit and that maintain right angles to one another, each of the suction units having at least one suction gripper, and wherein at least one of said suction units is an upper suction unit that grasps said at least one object to be gripped from above, and at least one of said suction units is a lateral suction unit that grasps said object from a lateral side, wherein said suction units are attached to said base unit such that, in order to grip said at least one object, said upper and lateral suction units are independently movable relative to said base unit so that a distance between said upper suction unit on the top side of said object and said lateral suction unit on the lateral side of said object may be varied.

2. The vacuum grip system according to claim 1, wherein the distance may be varied such that the lateral suction unit on the side of said object always grips said object in the lower area of said object.

3. The vacuum grip system according to claim 1, wherein, in order to grip said object, said vacuum grip system has at least two upper suction units and at least two lateral suction units, each having at least one suction gripper, wherein a distance between individual suction units parallel to the top side of said object and a distance between the individual suction units parallel to the lateral side of said object may be varied.

4. The vacuum grip system according to claim 1, wherein the upper suction unit on the top side of said object is guided in a vertically-movable fashion at the base unit of said vacuum grip system, and is fixable at a specified height, and that the lateral suction unit on the lateral side of said object is affixed to said base unit at a fixed height.

5. The vacuum grip system according to claim 1, wherein the upper suction unit on the top side of said object is affixed to said base unit of said vacuum grip system at a fixed height, and the lateral suction unit on the lateral side of said object is guided in a vertically-movable fashion at said base unit and is fixable at a specified height.

6. The vacuum grip system according to claim 1, wherein vertical displacement of at least one of the upper suction units on the top side of said object, and the lateral suction unit on the lateral side of said object, is affected by a displacement means.

7. The vacuum grip system according to claim 6, wherein the displacement means is at least one pneumatic cylinder disposed between the base unit of said vacuum grip system and the at least one of the upper and lateral suction units.

8. The vacuum grip system according to claim 6, wherein the displacement means is an electric motor that vertically displaces the at least one of the upper and lateral suction units by means of a gear arrangement.

9. A vacuum grip system for gripping at least one object, said vacuum grip system including a base unit and at least upper and lateral suction units that are separately affixed to the base unit and that maintain right angles to one another for respectively grasping said object from an upper and a lateral side, each of said suction units having at least one suction gripper, wherein said upper and lateral suction units are independently movable relative to said base unit, and wherein a mechanical undergripper is operatively engaged to said base unit of said vacuum grip system and is at least partially displaceable underneath said at least one object when it is lifted by said upper and lateral suction units.

10. The vacuum grip system according to claim 9, wherein a width of the undergripper may be varied.

11. The vacuum grip system according to claim 10, wherein the undergripper is constructed as a plate that is divided into at least two longitudinal partial plates that can be moved under, over, and into one another to vary the width of said undergripper.

12. The vacuum grip system according to claim 10, wherein the undergripper is constructed as a fork having at least two tines, wherein the distance between said tines may be varied.

13. The vacuum grip system according to claim 10, wherein the width of the undergripper is less than or equal to the width of the object lifted by the suction units.

14. The vacuum grip system according to claim 9, wherein the undergripper is constructed as a lattice grate.

15. The vacuum grip system according to claim 9, wherein the undergripper is constructed as a fork having at least two tines, wherein said tines can be sequentially telescoped outwardly or inwardly.

16. The vacuum grip system according to claim 15, wherein a depth of the telescoping motion of said undergripper may be varied.

17. The vacuum grip system according to claim 15, wherein on a top side of said undergripper a means for reducing friction between said undergripper and said object, is provided, at least while said undergripper is being pushed under said object.

18. The vacuum grip system according to claim 9, wherein said vacuum grip system has a means for moving said object onto the undergripper.

19. The vacuum grip system according to claim 9, wherein said vacuum grip system has identification means for determining a width of a side of said object on which the suction unit grips.

20. The vacuum grip system according to claim 19, wherein the identification means has a plurality of tracer pins adjacently arranged and swivelable about a common rotational axis, wherein one portion of said tracer pins contacts a surface of said object lifted by the suction units, and the other portion of said tracer pins is swiveled down next to said object.

21. The vacuum grip system according to claim 9, wherein the undergripper, as a result of at least one of its own weight and a displacement means, is guided in a vertically-movable fashion at the base unit of said vacuum grip system.

22. The vacuum grip system according to claim 21, wherein at the base unit of said vacuum grip system a stop is provided that is vertically movable and fixable at a specified height, and which limits displacement of the undergripper from below.

23. The vacuum grip system according to claim 22, wherein the vertical displacement of one of the undergripper and the stop is effected by a displacement means.

24. The vacuum grip system according to claim 23, wherein the displacement means is constructed as at least one pneumatic cylinder that is disposed between the base unit of said vacuum grip system and the one of the undergripper and the stop.

25. The vacuum grip system according to claim 23, wherein the displacement means is constructed as an electric motor that vertically displaces the one of the undergripper and the stop by a gear arrangement.

26. The vacuum grip system according to claim 9, wherein said vacuum grip system has a fine localization means to arrange said object in a predetermined location.

27. The vacuum grip system according to claim 26, wherein the fine localization means is constructed as two flat stop elements, disposed at right angles to one another and at a right angle to the undergripper, which are affixed to the base unit of said vacuum grip system, and wherein the sides of said object may be moved to rest against the surfaces of said stop elements.

28. The vacuum grip system according to claim 9, wherein said vacuum grip system has a fine localization means for determining the location of said object to be gripped.

29. The vacuum grip system according to claim 28, wherein the fine localization means is constructed as two flat stop elements, disposed at right angles to one another and at a right angle to the undergripper, which are swivel-mounted at the base unit of said vacuum grip system about the vertical axes (z axes) of said stop elements, wherein the surfaces of said stop elements may be moved to rest against the sides of said object, and a means for determining the swivel position of said stop elements is provided.

30. The vacuum grip system according to claim 28, wherein the means for determining the swivel position of said stop elements is constructed as path sensors, wherein one path sensor is respectively affixed on each stop plate, on both sides of the vertical axis, between said stop plate and the base unit of said vacuum grip system.

31. The vacuum grip system according to claim 28, wherein the lateral suction unit on the side of said object is designed as one of the flat stop elements.

32. The vacuum grip system according to claims 28, wherein at least one of the flat stop elements is swivel-mounted at the base unit of said vacuum grip system, between an operating position thereof and a rest position.

33. The vacuum grip system according to claim 28, wherein the fine localization is designed as tracer sensors, of which at least three of said tracer sensors are arranged in at least two different planes that are disposed at substantially right angles to one another, and that said tracer sensors may be brought to rest against the sides of said object to be gripped, and that a means for evaluation of the output signal of said tracer sensors is provided.

34. The vacuum grip system according to claim 9, wherein said vacuum grip system has a sensor for selecting one of said objects to be gripped by the suction units of said vacuum grip system, from objects arranged on a pallet, and for rough localization of said selected object.

35. The vacuum grip system according to claim 34, wherein the sensor is a laser sensor that scans over the objects on the pallet with a laser beam, whereby a means is provided to detect the transit time of said laser beam, so that from said transit time the shape of the surfaces of said objects arranged on said pallet may be determined, and that said object to be gripped by the suction units of said vacuum grip system may be selected according to a specified ranking order.

36. The vacuum grip system according to claim 35, wherein said object is selected according to the ranking order of upper, front, right.

37. The vacuum grip system according to claim 34, wherein said objects have an essentially rectangular design, and that the sensor roughly localizes the location of the edges at the upper, front, right corner of the selected object.

* * * * *